US008836794B2

(12) United States Patent
Vizgaitis

(10) Patent No.: US 8,836,794 B2
(45) Date of Patent: Sep. 16, 2014

(54) DUAL FIELD OF VIEW MULTI-BAND OPTICS

(75) Inventor: Jay N. Vizgaitis, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 617 days.

(21) Appl. No.: 13/209,633

(22) Filed: Aug. 15, 2011

(65) Prior Publication Data

US 2013/0044221 A1     Feb. 21, 2013

(51) Int. Cl.
*H04N 5/33* (2006.01)
*G02B 13/14* (2006.01)
*G02B 15/15* (2006.01)
*G02B 26/00* (2006.01)

(52) U.S. Cl.
CPC .............. *G02B 13/146* (2013.01); *G02B 26/00* (2013.01); *G02B 15/15* (2013.01)
USPC ........................................................ 348/164

(58) Field of Classification Search
CPC ...... G02B 27/14; G02B 13/14; G02B 13/146; G02B 15/14; G02B 15/15
See application file for complete search history.

(56) References Cited

U.S. PATENT DOCUMENTS

| 3,864,037 | A | * | 2/1975 | Johnson | 356/418 |
| 7,102,130 | B2 | | 9/2006 | Kerr | |
| 7,339,741 | B1 | | 3/2008 | Wang et al. | |
| 7,345,277 | B2 | | 3/2008 | Zhang | |
| 8,243,183 | B2 | * | 8/2012 | Nagaoka et al. | 348/335 |
| 2012/0002202 | A1 | * | 1/2012 | Chrisp | 356/328 |
| 2012/0098972 | A1 | * | 4/2012 | Hansen et al. | 348/164 |

\* cited by examiner

*Primary Examiner* — Huy T Nguyen
(74) *Attorney, Agent, or Firm* — Richard J. Kim

(57) ABSTRACT

A dual field of view, all-refractive infrared optical system that images the mid-wave infrared light in one field of view and the short wave infrared light in the second field of view onto the same detector. The two fields of view vary in focal length by a factor of six. The narrow field of view images the SWIR radiation at a slow f/number of 10.0 while the wide field of view images the MWIR radiation at f/1.9. The field of view is changed via a single lens that changes its axial position within the lens, resulting in an axial zoom. The change in focal length and f/number at the same time enables an increased focal length without having to increase the aperture size by the ratio of the focal length change, but rather by the ratio of the focal length change divided by the ratio of the f/number change.

13 Claims, 3 Drawing Sheets

| Element Number | ROC (Front) | ROC (Back) | Thickness (NFOV) | Thickness (WFOV) | Material | Aperture Diameter (Front) | Aperture Diameter (Back) |
|---|---|---|---|---|---|---|---|
| Object | Infinity | | Infinity | | | | |
| 1 | 47.49293 A(1) | 127.18729 | 12.039048 | | ZNSE | 60.8 | 58.0 |
| | | | 4.385713 | | A: -.316876e-6, B: -.156061e-9, C: .190409e-13, D: -.445285e-16 | | |
| 2 | 63.48678 | 43.34491 | 4.921860 | | GAAS | 48.0 | 43.0 |
| | | | 20.183293 | | | | |
| 3 | 53.39134 A(2) | 21.70556 | 5.992093 | | BAF2 | 29.4 | 24.4 |
| | | | 28.686159 | | A: -.122387e-5, B: .370470E-8, C: .298365e-11, D: -.302904e-13 | | |
| FILTER | INFINITY | INFINITY | 2.000 | | ZNSE | 20.0 | 20.0 |
| | | | 10.000 | | | | |
| 4 | 20.2146 | 39.6989 | 2.376679 | | ZNSE | 17.0 | 18.0 |
| | | | 44.194135 | 2.000 | | | |
| 5 | -13.76772 | -24.76321 | 3.528755 | | GAAS | 21.0 | 21.0 |
| | | | 13.369655 | 55.56379 | | | |
| 6 | 199.84095 | -62.39499 | 4.463180 | | ZNSE | 30.0 | 30.0 |
| | | | 14.727165 | | | | |
| 7 | -38.04072 | 29.01332 | 2.000 | | BAF2 | 24.2 | 24.2 |
| | | | 1.000 | | | | |
| 8 | 29.96455 A(3) | -150.81542 | 5.677814 | | ZNSE | 24.2 | 24.2 |
| | | | 6.000 | | A: -.952154e-5, B: .556399e-8, C: .460248e-10, D: .123594e-12 | | |
| Dewar Window | Infinity | Infinity | 1.250 | | SAPHIRE | 25.4000 | 25.4000 |
| | | | 4.400 | | | | |
| Cold Stop | Infinity | | 18.900 | | | 10.0 | |
| Image Plane | Infinity | | | | | | |

Figure 3

DUAL FIELD OF VIEW MULTI-BAND OPTICS

GOVERNMENT INTEREST

The invention described herein may be manufactured, used, sold, imported, and/or licensed by or for the Government of the United States of America.

FIELD OF THE INVENTION

This invention relates in general to multi-band optics, and more particularly, to dual field of view multi-band optics.

BACKGROUND OF THE INVENTION

Multi-spectral band systems are steadily emerging as a desired feature in a camera system. Each spectral band offers different image characteristics. Shorter wavelength spectral bands provide the potential for better resolution due to the smaller impact of diffraction on the size of the optics blur. This means that a smaller aperture optical system with a shorter wavelength can be used to see a further distance than that of a longer wavelength.

SUMMARY OF THE INVENTION

An exemplary eight-lens dual field of view multi-band optical imaging system is disclosed in which the field of view is changeable via the combination of changing the spectral band and the motion of a single lens in an axial translation along the optical axis. The spectral band is changed via changing a filter located in the optical path via a filter wheel, filter slide, or some other means. The narrow field of view images the SWIR spectral band and the wide field of view images the MWIR. The f/number of the two field of views are changed via the motion of the lens. The SWIR operates at an f/10 and the MWIR at f/1.9. The f/number in the MWIR is defined by the aperture stop located inside the dewar which is cooled to cryogenic temperatures and referred to a cold stop. This cold stop is attached to a radiation shield and controls emissive energy in the MWIR from outside the field of view from reaching the image plane. The SWIR f/number is defined by the aperture diameter of the first lens in the optical system. The eight lenses are designed to be well color corrected for their spectral bands within their specified field of view, but not well color corrected in the other field of view. The ratio of focal length changes between the two field of view is six. This results in a change of field of view of the same ratio.

In one aspect, a dual field of view multi-band optical imaging system is disclosed. Such an imaging system comprises a plurality of lenses optically arranged along an optical path to have its moveable lens moveable in its axial position; and a changeable filter disposed in said optical path. Changing the filter in the optical path changes the spectral band of the optical imaging system.

In another aspect, a method of optical imaging is disclosed based on the dual field of view multi-band optical imaging system. Such a method comprises the steps of setting the spectral band by changing the filter disposed in said optical path to enable transmission of one spectral band through the optical path, wherein said changeable filter is a mechanical filter based on either a filter wheel or a filter slide; and imaging said transmitted spectral band based on a detector.

Yet, in another aspect, an imager is disclosed based on eight lenses. Such an imager comprises a first lens being a zinc selenide lens disposed along an optical axis with an aspheric curvature on its first surface; a second lens being a gallium arsenide lens with spherical surfaces disposed after the first lens along said optical axis; a third lens being a barium fluoride optical element with an aspheric first surface and spherical second surface disposed after the second lens along said optical axis to receive light from the second lens; a filter configured after the third lens and along said optical axis; a fourth lens configured after the filter, said fourth lens being a zinc selenide lens with spherical curvatures on both surfaces; a fifth lens being a field of view switching lens that translates axially along the optical axis; a sixth lens being a zinc selenide lens with spherical surfaces disposed along said optical axis; a seventh lens being a barium fluoride lens with spherical surfaces disposed along said optical axis; an eighth lens being a zinc selenide lens disposed along said optical axis with an aspheric curvature on its first surface, wherein said lens seven and lens eight are configured to form an airspaced doublet; a dewar window disposed along said optical axis between the lens forming an airspaced doublet and an image plane; and a detector disposed along said optical axis capable of imaging at least one of MWIR and SWIR spectral bands.

BRIEF DESCRIPTION OF THE DRAWINGS

Additional advantages and features will become apparent as the subject invention becomes better understood by reference to the following detailed description when considered in conjunction with the accompanying drawings wherein:

FIG. 3 shows a table of ray trace values for the eight-lens imager from FIG. 1, including the change in the axial zoom values.

DETAILED DESCRIPTION

Figure 1:
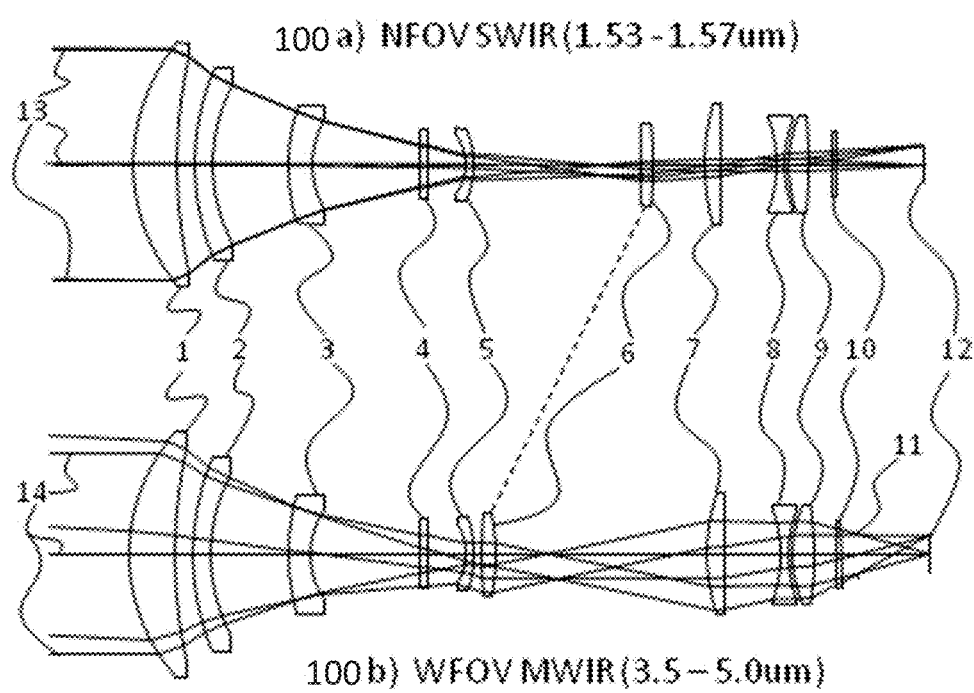
FIG. 1 shows an optical raytrace of an exemplary eight-lens imager in the (a) narrow field of view with the rays traced for the SWIR spectral band, and the (b) wide field of view with the rays traced for the MWIR spectral band.

An exemplary eight-lens dual field of view multi-band optical imaging system is shown in FIG. 1, where the field of view is changeable via the combination of changing the spectral band and the motion of a single lens (6) in an axial translation along the optical axis. FIG. 1 depicts a comparison between an exemplary optical arrangement of eight-lens imager in the narrow field of view (100a) with rays traced for the SWIR spectral band, and an exemplary optical arrangement of eight-lens imager in the wide field of view (100b) with rays traced for the MWIR spectral band. The method of axial zoom is shown via the motion of the fifth lens (6). The spectral band can be changed via a filter (e.g., a filter wheel) depicted by the parallel plate (4). The filter only passes the SWIR in the narrow field of view and the MWIR in the wide field of view.

An exemplary method of dual field of view multi-band optical imaging is disclosed. The spectral band is changeable by changing a filter located in the optical path (4) via a mechanical method such as a filter wheel or filter slide, to enable the transmission of only one spectral band through the optical path at any given time. The detector (12) images both spectral bands in a broadband capacity. The narrow field of view (NFOV) forms an image of the appropriate focal length only when the short wave infrared (SWIR) spectral band is allowed to pass. The wide field of view will only form an image with the appropriate focal length when the mid-wave infrared (MWIR) is allowed to pass through the filter. These spectral bands are defined as 1.55-1.59 microns for the SWIR and 3.5-5.0 microns for the MWIR for this optical system. The f/number of the two fields of view are changed via the motion of the lens which changes the focal length, and the changing of the aperture stop location between the field of view. The SWIR operates at an f/10 and the MWIR at f/1.9. The f/number in the WFOV MWIR is defined by the aperture stop located inside the dewar which is cooled to cryogenic temperatures and referred to as a cold stop (11). This cold stop is attached to a radiation shield and controls emissive energy in the MWIR from outside the field of view from reaching the image plane. The SWIR f/number is defined by the aperture diameter of the first lens (1) in the optical system, which becomes the aperture stop for this field of view. The changing of the focal length and aperture stop position combined enable the change of the f/number of the optical system without having to change the dimension of the cold stop (11) inside of the dewar which operates at cryogenic temperatures. It is not required to form a pupil at the cold stop location (11) for the NFOV due to the spectral band operation only occurring in the SWIR. This light is reflected and not emitted radiation, thus the cold stop is not needed for this field of view, as it is required for the MWIR WFOV. This provides freedom in the position of the reimaging of the aperture stop from the first lens to any location within the optic. In this case it ends up between the sixth (7) and seventh (8) lenses of the system for the NFOV.

The eight lenses are designed to be well color corrected for their spectral bands within their specified field of view, but not well color corrected in the other field of view. The ratio of focal length changes between the two field of view is a factor of six. This results in a change of field of view of the same ratio. Larger or smaller changes in focal length are also feasible through a similar concept. The eight lens imager is made up of multiple material types as described in the raytrace prescription of table of FIG. 3.

FIG. 3 shows a table of ray trace values for the eight-lens imager variously configured in FIG. 1, including the change in the axial zoom values. Referring to the elements commonly identified, the first lens (1) is a Zinc Selenide lens with an aspheric curvature on its first surface. This surface is the aperture stop for the NFOV SWIR, but not for the WFOV MWIR. The ray bundles for the NFOV (13) thus use a larger portion of the aperture than the WFOV ray bundles (14). The second lens (2) is a gallium arsenide lens with spherical surfaces which passes light to the third lens (3), a barium fluoride optical element with an aspheric first surface and spherical second surface. Located after the third lens is a filter (4) made from zinc selenide that has two planar and parallel surfaces. This filter is used to switch between the spectral bands. Each field of view uses a different filter that allows a different spectral band to pass.

Figure 2:
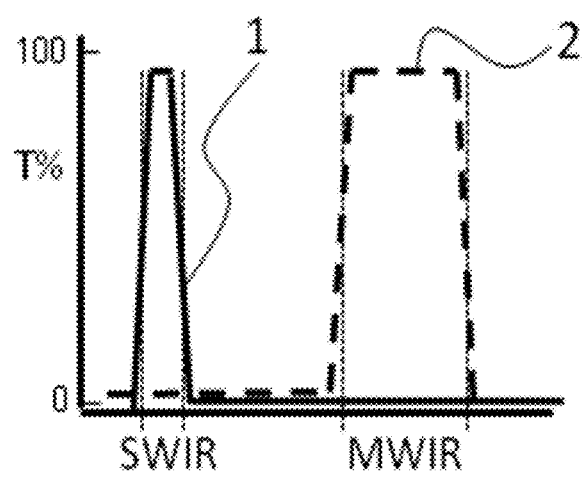
FIG. 2 shows exemplary transmission curves of the spectral bands for each field of view.

FIG. 2 shows an overlay of exemplary transmission curves as spectral bands for the respective field of view. As depicted, the NFOV transmits the SWIR and the WFOV transmits the MWIR. This transmission is controlled based on a change of the filter as the field of view is changed. The NFOV uses a filter that passes the narrow band SWIR spectral band while blocking the light out past the MWIR spectral band as shown in the dashed curve (1) of FIG. 2. The WFOV uses a filter that passes the MWIR spectral band while blocking other wavelengths down to below the SWIR as shown in the solid curve (2) of FIG. 2. This filter is changed via a mechanical mechanism such as a traditional filter wheel where each filter can be commanded to be moved in and out of the field of view as desired when the field of view is changed.

After the filter is the fourth lens (5), a Zinc Selenide lens with spherical curvatures on both surfaces. Only a small central portion of this lens is used in the NFOV while the full lens is used in the WFOV. The fifth lens (6) is the field of view switching lens that translates in an axial fashion along the optical axis. This Gallium Arsenide lens moves 42.2 mm along the optical axis to create the factor of six change in focal length between the NFOV and WFOV. This change in focal length is partly because of the motion of the lens, and partially because of the change in wavelength. The change in wavelength changes the operating index of refraction of each lens, and the thus also changes the optical properties of each lens, including the stationary ones. If the NFOV allows the MWIR to pass through the filter (4) rather than the SWIR, then its focal length would be 1634 mm, rather than the designed to 600 mm, and it would not image at the same image plane location. Utilizing the change in spectral bands has enabled a simplified field of view changing mechanism of a single lens to achieve the desired field of view ratio. The sixth lens (7) is a Zinc Selenide lens with spherical surfaces. Lenses seven (8) and eight (9) form an airspaced doublet. Lens seven (8) is a barium fluoride lens with spherical surfaces and lens eight (9) is a Zinc Selenide lens with an aspheric curvature on its first surface. A dewar window (10) is located between the lens and the image plane. This window is necessary because the cryogenically cooled focal plane array must be held in a vacuum. This window can be made from any optically transparent material for both the SWIR and MWIR spectral bands. The NFOV and WFOV image planes are collocated with a detector (12) that will image both of the MWIR and SWIR spectral bands.

It is obvious that many modifications and variations of the present invention are possible in light of the above teachings. It is therefore to be understood that within the scope of the appended claims, the invention may be practiced otherwise than as described.

What is claimed is:

1. A method of optical imaging based on a dual field of view multi-band optical imaging system comprising a plurality of lenses optically arranged along an optical path to have its moveable lens moveable in its axial position, and a changeable filter disposed in said optical path, wherein changing the filter in the optical path changes a spectral band of the optical imaging system, said method comprising the steps of:
   setting the spectral band by changing the filter disposed in said optical path to enable transmission of one spectral band through the optical path, wherein said changeable filter is a mechanical filter based on either a filter wheel or a filter slide; and
   imaging said transmitted spectral band based on a detector, wherein an f/number associated with a respective field of view is changeable based on at least one of the motion of the moveable lens which changes the focal length, and the changing of an aperture stop location.

2. The method of optical imaging according to claim 1, wherein SWIR operates at f/10 and MWIR at f/1.9.

3. The method of optical imaging according to claim 1, wherein the f/number in the WFOV MWIR is defined by an aperture stop associated with a dewar which is cooled to cryogenic temperatures.

4. An imager based on eight lenses, comprising:
   a first lens being a zinc selenide lens disposed along an optical axis with an aspheric curvature on its first surface;
   a second lens being a gallium arsenide lens with spherical surfaces disposed after the first lens along said optical axis;

a third lens being a barium fluoride optical element with an aspheric first surface and spherical second surface disposed after the second lens along said optical axis to receive light from the second lens;

a filter configured after the third lens and along said optical axis;

a fourth lens configured after the filter, said fourth lens being a zinc selenide lens with spherical curvatures on both surfaces;

a fifth lens being a field of view switching lens that translates axially along the optical axis;

a sixth lens being a zinc selenide lens with spherical surfaces disposed along said optical axis;

a seventh lens being a barium fluoride lens with spherical surfaces disposed along said optical axis;

an eighth lens being a zinc selenide lens disposed along said optical axis with an aspheric curvature on its first surface, wherein said lens seven and lens eight are configured to form an airspaced doublet;

a dewar window disposed along said optical axis between the lens forming an airspaced doublet and an image plane; and a detector disposed along said optical axis capable of imaging at least one of MWIR and SWIR spectral bands.

5. The imager according to claim 4, wherein said first surface of said first lens serves as an aperture stop for NFOV SWIR, but not for WFOV MWIR, wherein the ray bundles for NFOV use a larger portion of the aperture than the WFOV ray bundles.

6. The imager according to claim 4, wherein said filter is based on zinc selenide that has two planar and parallel surfaces, said filter being used to switch between the spectral bands, each field of view using a different filter that allows a different spectral band to pass.

7. The imager according to claim 4, wherein a central portion of said fourth lens is used for NFOV, whereas the full lens surface is used for WFOV.

8. The imager according to claim 4, wherein said fifth lens is a gallium arsenide lens capable of moving 42.2 mm along the optical axis to create a factor of six change in focal length between the NFOV and the WFOV, wherein the change in wavelength changes the operating index of refraction of each lens.

9. The imager according to claim 4, wherein said dewar window holds a cryogenically cooled focal plane array in a vacuum.

10. The imager according to claim 4, wherein said dewar window is based on an optically transparent material suitable for the SWIR and MWIR spectral bands.

11. The imager according to claim 4, wherein said image plane serves as either NFOV image plane or WFOV image plane.

12. The imager according to claim 11, wherein said detector is coincident with said NFOV and WFOV image planes.

13. The imager according to claim 12, wherein the NFOV uses a changeable filter that passes the narrow band SWIR spectral band while blocking the light out past the MWIR spectral band, and wherein the WFOV uses a changeable filter that passes the MWIR spectral band while blocking other wavelengths down to below the SWIR.

* * * * *